(12) United States Patent
Güntherberg et al.

(10) Patent No.: US 8,657,921 B2
(45) Date of Patent: Feb. 25, 2014

(54) SHELL AND TUBE HEAT EXCHANGER AND METHOD FOR REMOVING VOLATILE SUBSTANCES FROM A POLYMER SOLUTION

(75) Inventors: Norbert Güntherberg, Speyer (DE); Rainer Bardon, Dannstadt-Schauernheim (DE); Hartmut Heinen, Ludwigshafen (DE); Michael Sauer, Hockenheim (DE); Ludger Leber, Dannstadt-Schauernheim (DE); Wolfgang Fischer, Walldorf (DE)

(73) Assignee: Styrolution GmbH, Frankfurt (DE)

( * ) Notice: Subject to any disclaimer, the term of this patent is extended or adjusted under 35 U.S.C. 154(b) by 92 days.

(21) Appl. No.: 13/318,048

(22) PCT Filed: Apr. 27, 2010

(86) PCT No.: PCT/EP2010/055583
§ 371 (c)(1),
(2), (4) Date: Feb. 9, 2012

(87) PCT Pub. No.: WO2010/125037
PCT Pub. Date: Nov. 4, 2010

(65) Prior Publication Data
US 2012/0132406 A1 May 31, 2012

(30) Foreign Application Priority Data
Apr. 29, 2009 (EP) ..................................... 09159012

(51) Int. Cl.
*B01D 53/22* (2006.01)
*B01D 19/00* (2006.01)
*F28F 1/10* (2006.01)

(52) U.S. Cl.
USPC ................ 95/46; 95/251; 95/252; 96/6; 96/8; 96/11; 96/218; 165/172; 165/173

(58) Field of Classification Search
USPC ........ 95/46, 251, 252; 96/4, 6, 8, 10, 11, 204, 96/218, 219; 55/487, 525; 165/157, 158, 165/165, 172, 173
See application file for complete search history.

(56) References Cited

U.S. PATENT DOCUMENTS

| | | | | |
|---|---|---|---|---|
| 6,027,540 | A  * | 2/2000 | Smith et al. | ...................... 55/525 |
| 7,947,113 | B2 * | 5/2011 | Ogihara et al. | ................... 95/46 |
| 2004/0102593 | A1 | 5/2004 | Eitel et al. | |
| 2006/0034962 | A1 * | 2/2006 | Guntherberg et al. | ........ 425/208 |
| 2010/0297445 | A1 | 11/2010 | Guentherberg et al. | |

FOREIGN PATENT DOCUMENTS

| | | | | |
|---|---|---|---|---|
| EP | 1400337 A1 | 3/2004 | | |
| GB | 2 391 931 A | * 2/2004 | ............. F28F 27/02 |
| GB | 2391931 A | 2/2004 | | |
| WO | WO-02/00740 A1 | 1/2002 | | |
| WO | WO-02/090860 A1 | 11/2002 | | |
| WO | WO-2007/042529 A1 | 4/2007 | | |
| WO | WO 2007/042529 A1 | * 4/2007 | ............... F28D 7/16 |
| WO | WO-2007/054504 A1 | 5/2007 | | |
| WO | WO-2009/065891 A1 | 5/2009 | | |

* cited by examiner

*Primary Examiner* — Jason M Greene
(74) *Attorney, Agent, or Firm* — Novak Druce Connolly Bove + Quigg LLP

(57) ABSTRACT

A shell-and-tube heat exchanger, for removing volatile substances from a polymer solution by degasification, includes a bundle of tubes arranged vertically and parallel to each other in a shell chamber through which a fluid heat-transfer medium flows. The upper end of each tube is fixed in an upper tube sheet and the lower end of each tube is fixed in a lower tube sheet, and the polymer solution flows through the tubes in the direction of gravity. One feature is that a multilayer woven wire fabric is attached to the top of the upper tube sheet. The finest meshed layer of the fabric has a mesh width of 50 μm to 1000 μm. The invention also relates to a method for removing volatile substances from a polymer solution by degasification in a shell-and-tube heat exchanger and use of the shell-and-tube heat exchanger.

10 Claims, No Drawings

SHELL AND TUBE HEAT EXCHANGER AND METHOD FOR REMOVING VOLATILE SUBSTANCES FROM A POLYMER SOLUTION

PRIORITY

Priority is claimed as a national stage application, under 35 U.S.C. §371, to PCT/EP2010/055583, filed Apr. 27, 2010, which claims priority to European Application No. 09159012.5, filed Apr. 29, 2009. The disclosures of the aforementioned priority applications are incorporated herein by reference in their entirety.

BACKGROUND

The invention relates to a shell-and-tube heat exchanger for removing volatile substances from a polymer solution by degassing, which comprises a bundle of parallel vertical tubes arranged within a shell through which a fluid heat transfer medium flows, with the tubes each being fixed at their upper end in an upper tube plate and at their lower end in a lower tube plate and the polymer solution to be degassed flowing through the tubes in the direction of gravity. The invention further provides a method of removing volatile substances from a polymer solution by degassing in a shell-and-tube heat exchanger and also the use of said shell-and-tube heat exchanger.

Thermoplastic polymers such as polystyrene (PS), impact-modified PS (HIPS) or styrene-acrylonitrile copolymers (SAN) are frequently prepared by the solution polymerization process. To obtain the desired polymeric materials, an important process step is the removal of volatile substances, in particular unreacted monomers, low molecular weight reaction products (oligomers), decomposition products, auxiliaries and especially solvents, from the polymer solution obtained after the polymerization.

The isolation of the volatile substances from polymer solutions is frequently carried out by degassing, in which the volatile substances are converted into the gaseous state by introduction of heat and optionally lowering of the pressure and are separated off in this state from the molten polymers.

As regards apparatuses for carrying out degassing, many process variants are known, among which degassing in shell-and-tube heat exchangers has been found to be particularly useful for degassing polymer solutions, in particular in the low- and intermediate-viscosity range. These heat exchangers are apparatuses which have no mechanically moved parts and are relatively unsusceptible to malfunctions.

Shell-and-tube heat exchangers which can be used for degassing comprise, like conventional shell-and-tube apparatuses, a bundle of parallel vertical tubes (i.e. tubes which are arranged parallel to one another and parallel to the direction of gravity) which are fixed at each end in a tube plate. The polymer solution is fed into the tubes and degassed in these; a heat transfer medium is passed through the space between the tubes and heats the polymer solution or melt and also the devolatilization products of the polymer solution. Particularly in the case of large apparatuses having many tubes, it is necessary to distribute the polymer solution to be degassed uniformly over all tubes in order to achieve a uniform product quality.

WO-A 02/00740 describes a shell-and-tube heat exchanger for the degassing of polymer solutions in a first degassing stage, in which a distributor plate (perforated plate) which produces an increased pressure drop in the space before the tubes can be provided in order to distribute the stream entering the shell-and-tube apparatus uniformly over the individual tubes. The process should, in particular, be operated so that no orifice plates or constrictions are provided within the tubes and so that the pressure drop of the flow into the tubes is therefore low. In the process of WO-A 02/00740, a continuous degasser which effects more complete removal of volatile substances is installed in a second degassing stage downstream of the shell-and-tube heat exchanger.

WO-A 07/54504 and WO-A 07/42529 describe shell-and-tube heat exchangers for degassing polymer solutions, which have specific internal fittings within the tubes to produce, inter alia, a preferable step decrease in pressure between tube inlet and degassing region in the interior of the tubes.

When known shell-and-tube heat exchangers and the abovementioned methods of degassing polymer solutions are used, formation of deposits and/or blockages sometimes occur(s) at the entry point of the polymer solution to be degassed into the individual tubes of the shell-and-tube heat exchanger. As a result, cleaning of parts of the shell-and-tube heat exchanger or even replacement of individual tubes and/or any tube inlet nozzles present becomes necessary at regular intervals. This leads to multiday downtimes with correspondingly high production losses and costs. Furthermore, these deposits can become detached and be carried out with the product stream, so that they can block constrictions in the transport path of the product stream and/or remain in the polymer and contaminate this.

It is therefore an object of the present invention to discover shell-and-tube heat exchangers and methods for degassing polymer solutions which, in comparison to known apparatuses and methods, require less frequent shutdowns for cleaning or maintenance and minimize the proportion of visible contamination in the polymer.

We have accordingly found the shell-and-tube heat exchangers mentioned at the outset for removing volatile substances from a polymer solution by degassing, with it being important for the purposes of the invention that a multilayer (i.e. at least two-layer) woven wire mesh whose finest-meshed layer has a mesh opening of from 50 μm to 1000 μm is installed on the upper side of the upper tube plate.

The shell-and-tube heat exchangers, methods and uses according to the invention make it possible to degas polymer solutions with less frequent shutdowns for cleaning or maintenance than is possible using known apparatuses and methods and to produce polymers which have significantly less visible contamination.

DESCRIPTION

The shell-and-tube heat exchangers, methods and uses according to the invention are described below.

Shell-and-tube heat exchangers for removing volatile substances from a polymer solution by degassing, which comprise a bundle of parallel vertical tubes arranged within a shell through which a fluid heat transfer medium flows, with the tubes each being fixed at their upper end in an upper tube plate and at their lower end in a lower tube plate and the polymer solution to be degassed flowing through the tubes in the direction of gravity, are known to those skilled in the art and are described in the literature (see, for example, WO-A 02/00740, WO-A 07/54504 and WO-A 07/42529).

The shell-and-tube heat exchanger of the invention is preferably designed so that the heat transfer medium-side heat transfer coefficient is in the range from 500 to 2000 W/m$_2$/K, preferably from 800 to 1200 W/m$_2$/K.

The shell-and-tube heat exchanger preferably comprises from 100 to 10,000 tubes, preferably from 450 to 3500 tubes, particularly preferably from 1500 to 1700 tubes. The length of the tubes of the shell-and-tube heat exchanger is usually in the range from 0.3 to 10 m, preferably from 0.5 to 6 m, more preferably from 1.0 to 3 m. The tubes preferably have internal diameters in the range from 5 to 30 mm, preferably from 8 to 25 mm, more preferably from 10 to 18 mm.

To distribute the polymer solution over the individual tubes of the shell-and-tube heat exchanger, a perforated plate or a distributor plate can, in a preferred embodiment, be installed between the upper tube plate and the multilayer woven wire mesh.

The tubes of the shell-and-tube heat exchanger are heated by a liquid or gaseous heat transfer medium flowing through the space around the tubes. Here, it is possible for a single heat transfer medium circuit to be provided, but it is also possible, particularly when a liquid heat transfer medium is used for heating, to provide a plurality of heat transfer medium circuits in order to achieve individual zones having different temperatures. This can be necessary, in particular, to remove different components which each have different degassing properties.

Possible gaseous heat transfer media are, for example, hot steam or Diphyl vapor. Preference is given to using a liquid heat transfer medium, in particular a heat transfer oil.

Usual heat transfer medium temperatures are in the range from 100 to 380° C., preferably from 120 to 350° C., more preferably from 130 to 340° C.

The lower end of the tubes of the shell-and-tube heat exchanger opens into a degassing region to which a vacuum is applied, frequently in the range from 5 to 100 mbar, preferably from 12 to 70 mbar, more preferably from 20 to 50 mbar.

In a preferred embodiment of the shell-and-tube heat exchanger, the tubes are provided with inlet nozzles and/or internal fittings for reducing the free cross section of the tubes. Preferred embodiments are described, for example, in WO-A 07/54504 and WO-A 07/42529.

The shell-and-tube heat exchangers of the invention can also have various internal fittings in the space within the shell for controlling the flow direction of the heat transfer medium, as is described in WO-A 07/42529.

In the shell-and-tube heat exchangers of the invention, a multilayer woven wire mesh whose finest-meshed layer has a mesh opening of from 50 µm to 1000 µm, preferably from 100 µm to 800 µm, particularly preferably from 200 µm to 750 µm, is installed on the upper side of the upper tube plate.

All mesh openings specified in the context of the present invention are the largest free distances between two adjacent parallel warp wires and two adjacent parallel weft wires or, in the case of woven wire meshes which do not have rectangular openings, the largest free distance between the mesh wires forming an opening.

Multilayer woven wire meshes are known per se (for example from EP-A 1 400 337) and are, for example, marketed commercially for melt filtration purposes or as inflow screens for fluidized-bed reactors. However, they can also be produced from parts known per se.

Multilayer woven wire meshes made up of two or three or more, for example up to 30, layers, preferably from 2 to 10 layers, are very mechanically stable and are therefore preferred. Preference is given to multilayer woven wire meshes which have a coarsely woven support layer (support mesh) which has large openings but is mechanically stable and built up on this ever more finely woven intermediate and filter layers having ever smaller mesh openings (known as woven metal wire mesh composite plates (MCP)). Preferred MCPs have a support layer having a mesh opening of from 1 mm to 15 mm, preferably from 2 mm to 10 mm, particularly preferably from 3 mm to 7 mm, and one or more further layers of which the finest-meshed layer has a mesh opening of from 50 µm to 1000 µm, preferably from 100 µm to 800 µm, particularly preferably from 200 µm to 750 µm.

For most applications, preference is given to the finest-meshed layer of the multilayer woven wire mesh being farthest from the upper tube plate, i.e. facing the flow of the polymer solution to be degassed.

The type of weave can be the same for all layers of the multilayer woven wire meshes. However, it is also possible for the type of weave to be the same for some layers and then change or to change from layer to layer. Type of weave and number of layers depend on the respective task, in particular the required mechanical strength or the pressure conditions.

To increase the mechanical strength of multilayer woven wire meshes, the individual layers can be sintered to one another.

The materials of which the multilayer woven wire meshes are made depend on the application. In general, they are zinc- or tin-plated unalloyed steels, NiC (carbon) steels, Cr steels, stainless steels such as martensitic or austenitic steels of the material groups 1.43 (CrNi steels) or 1.44 (CrNiMo steels). However, steels which are resistant to high temperatures and meshes made of copper, nickel, titanium or aluminum alloys are also possible. Polished, in particular smooth to mirror-smooth, metallic materials can also be used. Metallic surfaces which have the "lotus" effect are also conceivable. Most applications can be covered by the material groups 1.40 to 1.45, among which chromium-nickel-molybdenum steels are most frequently used.

The multilayer woven wire meshes can be freed of residues or deposits in a simple manner by backflushing, brushing or burning off, since little or no deep loading within the woven mesh layers generally occurs.

The inventive methods of removing volatile substances from a polymer solution by degassing in a shell-and-tube heat exchanger, with the shell-and-tube heat exchanger comprising a bundle of parallel vertical tubes within a shell through which a fluid heat transfer medium flows and the tubes each being fixed at their upper end in an upper tube plate and at their lower end in a lower tube plate and the polymer solution to be degassed flowing through them in the direction of gravity, i.e. from the top downward, and degassing of the polymer solution occurring by reducing the pressure and introducing heat within the tubes, make use of the above-described embodiments of the shell-and-tube heat exchanger of the invention as degassing apparatus.

The polymer solution to be degassed usually comes directly from the polymerization reactor, for example a continuously operated stirred vessel, a cascade of stirred vessels or a tube reactor, and is at the pressure and temperature which largely correspond to the polymerization conditions. However, it is also possible to increase the pressure and temperature level relative to the polymerization conditions by means of pressure-increasing apparatuses, for example melt pumps, extruders, etc., and optionally heat exchangers.

It is usual to work at, in particular, entry temperatures into the shell-and-tube heat exchanger of from 100 to 300° C., preferably from 120 to 280° C., more preferably from 150 to 250° C., and entry pressures in the range from 5 to 80 bar absolute, preferably from 8 to 60 bar absolute, more preferably from 10 to 40 bar absolute. Further process details have been disclosed above in the description of the shell-and-tube heat exchanger of the invention (for example heat transfer medium temperatures, preferred pressures in the degassing region, etc.) and can be employed correspondingly for the methods of the invention.

The polymer solution which is fed into the shell-and-tube heat exchanger for the purpose of degassing usually has a polymer content of from 50 to 95% by weight of the polymer solution, preferably from 45 to 90% by weight and more preferably from 60 to 85% by weight.

Usual throughputs for the polymer solution are in the range from 0.5 to 30 kg of polymer solution per hour and tube, preferably from 1 to 25 kg of polymer solution per hour and tube, more preferably from 2 to 20 kg of polymer solution per hour and tube.

In a preferred embodiment of the method of the invention, a further degassing step for removing remaining volatile substances from the polymer solution in a continuous degasser is carried out after degassing of the polymer solution in the shell-and-tube heat exchanger. The further configuration of the two-stage degassing method is known in principle to those skilled in the art and is described, for example, in WO-A 02/00740.

The content of volatile substances, for example residual monomers, oligomers or solvents, in the polymer solution prior to degassing can vary within a wide range and is greatly dependent on the type of polymer and the type of production process. In the case of an SAN solution prepared by the solution polymerization process, the content of volatile substances can be, for example, in the range from 20% by weight to 80% by weight, preferably from 30% by weight to 70% by weight, particularly preferably from 40% by weight to 60% by weight (in each case based on the total weight of the polymer solution and determined by means of gas chromatography).

The content of volatile substances in the polymer solution or the polymer melt after degassing in the shell-and-tube heat exchangers of the invention is generally in the range from 100 ppm to 10 000 ppm, preferably from 150 ppm to 3000 ppm, particularly preferably from 200 ppm to 1000 ppm (in each case based on the total weight of the polymer solution or melt and determined by means of gas chromatography).

The above-described further degassing step in a continuous degasser which can be carried out after degassing in the shell-and-tube heat exchangers of the invention enables even more complete removal of volatile substances to be achieved.

The further processing of the degassed polymer melt to produce, for example, pellets or moldings is known to those skilled in the art and is described in the literature.

The shell-and-tube heat exchanger, method and uses according to the invention make it possible to degas polymer solutions with less frequent shutdowns for cleaning or maintenance than is possible when known apparatuses and methods are used. Furthermore, the shell-and-tube heat exchangers, methods and uses according to the invention make it possible to produce polymers which have significantly less visible contamination. In addition, the multilayer woven wire meshes bring about more uniform distribution of the polymer solution over the individual tubes of the shell-and-tube heat exchanger.

The invention is illustrated below with the aid of examples.

EXAMPLES

Ex. C-1 (For Comparison)

An SAN solution prepared by solution polymerization was degassed under customary conditions in a shell-and-tube heat exchanger which comprised a bundle of parallel vertical tubes arranged within a shell through which a fluid heat transfer medium flowed, with the tubes each being fixed at their upper end in an upper tube plate and at their lower end in a lower tube plate and the polymer solution to be degassed flowing through them in the direction of gravity. To achieve more uniform distribution of the flow, each tube was provided at its inlet opening with an internal fitting to reduce the free cross section of the tubes, hereinafter referred to as "plug", which was provided with a central hole having a diameter of 1.8 mm and a hole length of 25 mm parallel to gravity. A mixture of 65% by weight of SAN and 35% by weight of volatile constituents (comprising solvent and residual monomers such as styrene, acrylonitrile and ethylbenzene) was fed to the upper tube plate of the shell-and-tube heat exchanger at a temperature of 170° C. The throughput per plug was 6.2 kg/h and the pressure was 30 bar upstream of the plug and 1 bar downstream of the plug. The shell-and-tube heat exchanger was divided into three heating zones (150° C./195° C./330° C.). The temperature of the discharge pot below the lower tube plate of the shell-and-tube heat exchanger was 250° C. and the pressure in this discharge pot was 30 mbar. The residual content of volatile substances in the polymer melt obtained after degassing in the shell-and-tube heat exchanger was 856 ppm (based on the total weight of the polymer melt and determined by means of gas chromatography). The operating time until a no longer acceptable content of visible contamination in the polymer occurred was from 6 to 12 months.

Ex. 2

The same SAN solution prepared by solution polymerization which was used in Ex. C-1 was degassed in a shell-and-tube heat exchanger which differed from the shell-and-tube heat exchanger used in Ex. C-1 only in the presence of a multilayer woven wire mesh whose finest-meshed layer had a mesh opening of 500 μm on the upper side of the upper tube plate under conditions which were otherwise identical to Ex. C-1. The residual content of volatile substances in the polymer melt obtained after degassing in the shell-and-tube heat exchanger was 847 ppm (based on the total weight of the polymer melt and determined by means of gas chromatography). The operating time until a no longer acceptable content of visible contamination in the polymer occurred was from 24 to 30 months.

Ex. C-3 (For Comparison)

The same SAN solution prepared by solution polymerization which was used in Ex. C-1 was degassed in a shell-and-tube heat exchanger which differed from the shell-and-tube heat exchanger used in Ex. C-1 only in the presence of a commercial melt filter having a pore width of 250 pm in the melt discharge line downstream of the shell-and-tube heat exchanger under conditions which were otherwise identical to Ex, C-1. After a period of operation of a number of weeks, the melt filter had to be changed ever more frequently. The shell-and-tube heat exchanger had to be shut down and cleaned after a period of time comparable to Ex. C-1 (6-12 months) because of blockage of part of the plugs.

In the case of the degassing according to the invention as per Ex. 2, the trouble-free periods of operation between two shutdowns for necessary cleaning and maintenance work on the shell-and-tube heat exchanger were from two to three times as long as in the case of the degassings as per Ex. C-1 and even Ex. C-3 carried out with additional apparatus.

The examples demonstrate that the shell-and-tube heat exchangers, methods and uses according to the invention make it possible to degas polymer solutions with less frequent shutdowns for cleaning or maintenance and produce polymers having an acceptably low content of visible contamination over trouble-free periods of operation which are from two to three times as long as is possible using known apparatuses and methods.

The invention claimed is:

1. A shell-and-tube heat exchanger for removing volatile substances from a polymer solution by degassing, comprising:
a bundle of parallel vertical tubes arranged within a shell through which a fluid heat transfer medium flows, wherein each tube is fixed at its upper end in an upper tube plate and fixed at its lower end in a lower tube plate and wherein the polymer solution to be degassed flows through the tubes in the direction of gravity, and wherein a multilayer woven wire mesh comprises a finest-meshed layer with a mesh opening ranging from 50 μm to 1000 μm is installed on an upper side of the upper tube plate.

2. The shell-and-tube heat exchanger according to claim 1, wherein the multilayer woven wire mesh further comprises a support layer having a mesh opening of from 1 mm to 15 mm and one or more further layers of which the finest-meshed layer has a mesh opening of from 50 μm to 1000 μm.

3. The shell-and-tube heat exchanger according to claim 1, further comprising one or more additional layers each having a finest-meshed layer with a mesh opening of from 50 μm to 1000 μm.

4. The shell-and-tube heat exchanger according to claim 1, wherein the finest-meshed layer of the multilayer woven wire mesh faces away from the upper tube plate.

5. The shell-and-tube heat exchanger according to claim 1, wherein the tubes are provided with inlet nozzles and internal fittings for reducing the free cross section of the tubes.

6. The shell-and-tube heat exchanger according to claim 1, wherein the tubes are provided with internal fittings for reducing the free cross section of the tubes.

7. The shell-and-tube heat exchanger according to claim 1, wherein the tubes are provided with internal fittings for reducing the free cross section of the tubes.

8. The shell-and-tube heat exchanger according to claim 1, wherein a perforated plate or a distributor plate is installed between the upper tube plate and the multilayer woven wire mesh.

9. A method of removing volatile substances from a polymer solution, comprising
providing a shell-and-tube heat exchanger according to claim 1, wherein the shell-and-tube heat exchanger comprises a bundle of parallel vertical tubes within a shell through which a fluid heat transfer medium flows, wherein each vertical tube is fixed at its upper end in an upper tube plate and at its lower end in a lower tube plate;
flowing of polymer solution to be degassed through the vertical tubes in the direction of gravity; and
degassing the polymer solution by reducing the pressure and introducing heat within the vertical tubes.

10. The method according to claim 9, further comprising removing remaining volatile substances from the polymer solution in a continuous degasser after degassing of the polymer solution in the shell-and-tube heat exchanger.

* * * * *

UNITED STATES PATENT AND TRADEMARK OFFICE
CERTIFICATE OF CORRECTION

PATENT NO.        : 8,657,921 B2
APPLICATION NO.   : 13/318048
DATED             : February 25, 2014
INVENTOR(S)       : Güntherberg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 193 days.

Signed and Sealed this

Twenty-ninth Day of September, 2015

Michelle K. Lee
*Director of the United States Patent and Trademark Office*